UNITED STATES PATENT OFFICE.

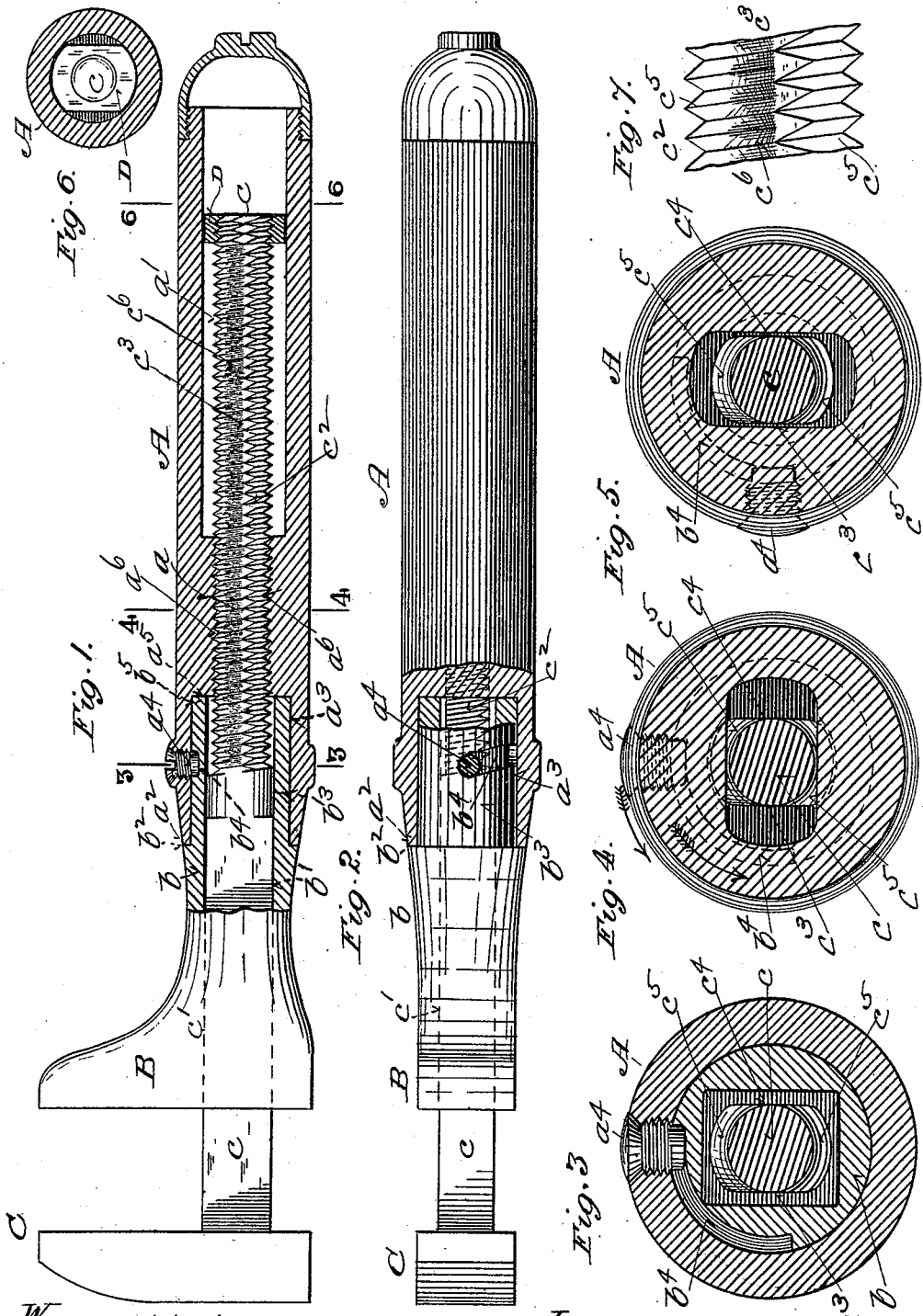

JOHN F. COOK, OF ST. LOUIS, MISSOURI.

WRENCH.

SPECIFICATION forming part of Letters Patent No. 516,591, dated March 13, 1894.

Application filed January 4, 1894. Serial No. 495,663. (No model.)

*To all whom it may concern:*

Be it known that I, JOHN F. COOK, of St. Louis, Missouri, have made a new and useful Improvement in Wrenches, of which the following is a full, clear, and exact description.

The improvement relates to that class of wrenches in which the outer jaw is movable by being attached to a shank that can be adjusted longitudinally in the fixed or handle-portion of the wrench and be locked therein at the desired point of adjustment, and the improvement has special reference to the relative shape of the outer jaw shank and the coacting portion of the handle whereby the outer jaw can be readily opened or closed to the desired distance from the inner jaw and then fixed, and also to the means for limiting the rotary movement of the handle upon the outer jaw shank and at the same time tightening and loosening the inner jaw as the handle is turned to lock and unlock the outer jaw, substantially as is hereinafter set forth and claimed, aided by the annexed drawings, making part of this specification, in which—

Figure 1 is a side sectional, elevation of a wrench having the improvement embodied therein; Fig. 2 an edge, sectional, elevation of the wrench; Fig. 3 a cross section on the line 3—3 of Fig. 1; Fig. 4 a cross section on the line 4—4 of Fig. 1; Fig. 5 a cross section on the line 4—4 of Fig. 1, but showing the handle and jaw-shank in a different relative position; Fig. 6 a cross section on the line 6—6 of Fig. 1; and Fig. 7 an edge elevation of a portion of the outer-jaw shank. Figs. 3, 4, 5 and 7 are upon enlarged scales.

The same letters of reference denote the same parts.

A represents the handle, B the inner jaw, and C the outer jaw. The last named jaw is attached to a shank $c$ that, when the parts of the wrench are assembled, extends through the inner-jaw and into the handle and is adapted to be moved longitudinally therein. The shank is squared, or otherwise shouldered, at $c'$ where it passes through the inner jaw, and the portion $c^2$ which works in the handle is threaded to engage with a threaded portion $a$ of the handle. The inner jaw and its shank $b$ are slotted at $b'$ to receive and fit the shank $c$, and the handle is chambered at $a'$ to receive the portion $c^2$ of the shank $c$, substantially as shown. The inner jaw shank $b$ is shouldered at $b^2$ to encounter a shoulder $a^2$ upon the handle, and it is rounded at $b^3$ to fit in a round socket $a^3$ in the handle. It is also grooved or slotted at $b^4$ to receive a stud $a^4$ that is attached to the handle and whose inner end extends to engage in the groove $b^4$. The threaded shank-portion $c^2$ is flattened at its opposite sides $c^3$, $c^4$, or in any other equivalent manner constructed, to enable the shank, by turning the handle, whose portion $a$ is correspondingly constructed as shown, one quarter turn around, to become interlocked with the shank $c$, and by turning at a corresponding distance backward to be disengaged from the shank $c$. When the shank is disengaged from the handle the shank carrying the outer-jaw, can be drawn directly outward or closed inward in the handle to enable the jaws to be at once relatively adjusted as may be desired, and by simply turning the handle one quarter around the outer jaw becomes fixed. In this last described manipulation of the parts it is important that the threads of the shank and handle be enabled to readily engage. To this end the threads $c^5$ on the shank, at that end thereof which is opposed to the handle-thread, are beveled or sharpened substantially as shown at $c^6$, and the coacting end of the handle-threads $a^6$ is (not shown) correspondingly shaped, and thus when the two threads meet each other they are readily deflected into engagement. As the handle is being rotated to and fro it is essential that it be sufficiently free of the inner jaw. At the same time when the handle is turned to lock the outer jaw it is essential that the inner jaw also be fixed so that it cannot swing away from the nut or whatever object the wrench is applied to. It is further quite desirable to limit the movement of the handle as it is rotated in order that, in locking the outer jaw, the handle shall not be turned around so far as to pass the locking position, and, in unlocking the outer jaw, to be turned backward so far as to pass the unlocking position. These ends are attained by the means of the slot-and-stud construction above named. The groove $b^4$ (or slot as it may be) extends one quarter around the inner jaw shank, and it is suitably located with reference to the unlocked and the locked positions of the shank $c$. The groove is also inclined as shown substantially in Fig. 2. Therefore, when the handle is rotated to effect the locking of the outer-jaw, the movement is terminated by reason of the stud $a^4$ reaching the end of the groove, and at the same time the inner jaw, by reason of the described obliquity of the slot, is drawn tightly to its bearing upon the handle, and as a result the two jaws are firmly held the proper distance apart. The movement of the handle in the opposite direction not only effects the release of the outer jaw but also loosens the inner jaw upon the handle. An additional advantage derived from the described tightening of the inner jaw upon the handle is that the inner jaw in such movement moves in the same direction in which the outer jaw is moving. For as the handle is turned to lock the outer jaw that jaw is drawn slightly inward by reason of the engagement of the handle-threads with the shank-threads, and the space between the jaws would be shortened but for the fact of the simultaneous movement of the inner jaw toward the handle. The groove $b^4$ is preferably inclined somewhat more than is the handle-thread. The inner end of the shank $c$ is preferably steadied by means of the nut D which fits the chamber in the handle, and is applied to the shank to slide with it.

I desire not to be restricted to the shoulders $b^2$, $a^2$ for limiting the inward movement of the inner jaw. Other shoulders—$b^5$, $a^5$ for instance—may be employed for the purpose mentioned, and if desired the last named shoulder may be used in conjunction with the first named substantially as shown.

I claim—

The combination of the handle, the inner jaw, and the outer jaw, the shank of said outer jaw being shouldered and the inner portion of the shank being threaded on opposite sides, said inner jaw being fitted to receive said outer jaw shank, and being shouldered to coact with the handle and having the inclined groove, and being fitted to a rounded socket in the handle, and said handle having a threaded portion to coact with said threaded shank, and having a stud to engage with said inner jaw groove, and also being shouldered to coact with the said inner jaw, substantially as described.

Witness my hand this 2d day of January, 1894.

JOHN F. COOK.

Witnesses:
C. D. MOODY,
EDWARD W. FARRELL.